United States Patent
Liu et al.

(10) Patent No.: US 12,223,114 B2
(45) Date of Patent: Feb. 11, 2025

(54) INTERACTIVE CONTROL APPARATUS AND INTERACTIVE SYSTEM

(71) Applicants: Beijing BOE Technology Development Co., Ltd., Beijing (CN); BOE TECHNOLOGY GROUP CO., LTD., Beijing (CN)

(72) Inventors: Zongmin Liu, Beijing (CN); Li Ma, Beijing (CN); Feng Qu, Beijing (CN); Dongdong Zhang, Beijing (CN); Wei Li, Beijing (CN); Xichao Fan, Beijing (CN); Junwei Guo, Beijing (CN); Biqi Li, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/786,234

(22) PCT Filed: Jun. 24, 2021

(86) PCT No.: PCT/CN2021/102070
§ 371 (c)(1),
(2) Date: Jun. 16, 2022

(87) PCT Pub. No.: WO2022/266931
PCT Pub. Date: Dec. 29, 2022

(65) Prior Publication Data
US 2024/0184377 A1 Jun. 6, 2024

(51) Int. Cl.
*G06F 3/01* (2006.01)
*G01S 7/41* (2006.01)
*G01S 13/88* (2006.01)

(52) U.S. Cl.
CPC .............. *G06F 3/017* (2013.01); *G01S 7/415* (2013.01); *G01S 7/417* (2013.01); *G01S 13/88* (2013.01)

(58) Field of Classification Search
CPC .......... G01S 7/415; G01S 7/417; G01S 13/88; G06F 3/017
See application file for complete search history.

(56) References Cited

U.S. PATENT DOCUMENTS

| | | | |
|---|---|---|---|
| 11,221,404 B1 * | 1/2022 | DeSalvo | G06F 3/014 |
| 11,416,077 B2 * | 8/2022 | Baheti | G01S 13/06 |

(Continued)

FOREIGN PATENT DOCUMENTS

| | | |
|---|---|---|
| CN | 101192704 A | 6/2008 |
| CN | 106484162 A | 3/2017 |

(Continued)

OTHER PUBLICATIONS

Xia et al., "Micro-motion gesture recognition based on multi-channel frequency modulated continuous wave millimeter wave radar," J. Electronics & Information Technology, Jan. 2020, pp. 164-172, vol. 42, No. 1. English Abstract.

(Continued)

*Primary Examiner* — Tadesse Hailu
(74) *Attorney, Agent, or Firm* — HOUTTEMAN LAW LLC

(57) ABSTRACT

The present disclosure provides an interactive control apparatus and an interactive system. The interactive control apparatus includes: an antenna array configured to transmit a radar signal and receive a reflected echo signal; a data processing assembly configured to determine, according to the radar signal and the echo signal, a body action and a corresponding control instruction, and output the control instruction to a terminal device; and a display assembly (Continued)

configured to display the determined body action and/or control instruction.

20 Claims, 7 Drawing Sheets

(56) References Cited

U.S. PATENT DOCUMENTS

| | | | | |
|---|---|---|---|---|
| 11,862,876 | B2* | 1/2024 | Kim | H01Q 1/243 |
| 11,947,002 | B2* | 4/2024 | Wang | G01S 13/53 |
| 11,953,619 | B2* | 4/2024 | Avila | G01S 13/42 |
| 2015/0237662 | A1 | 8/2015 | Fischer | |
| 2016/0041617 | A1* | 2/2016 | Poupyrev | G01S 13/04 |
| | | | | 345/156 |
| 2016/0259037 | A1* | 9/2016 | Molchanov | G01S 7/0233 |
| 2018/0235481 | A1* | 8/2018 | Liu | A61B 5/0205 |
| 2018/0376373 | A1* | 12/2018 | Liao | H04W 28/088 |
| 2019/0350465 | A1 | 11/2019 | Sahin et al. | |
| 2020/0073480 | A1 | 3/2020 | Hof et al. | |
| 2020/0233079 | A1* | 7/2020 | Silverstein | G01S 13/765 |
| 2021/0199755 | A1* | 7/2021 | Emadi | G01S 7/03 |
| 2021/0356558 | A1* | 11/2021 | Fuchs | G01S 7/356 |
| 2021/0389448 | A1* | 12/2021 | Miyaoka | G01S 13/345 |

FOREIGN PATENT DOCUMENTS

| | | |
|---|---|---|
| CN | 106537173 A | 3/2017 |
| CN | 106932947 A | 7/2017 |
| CN | 107120701 A | 9/2017 |
| CN | 108361780 A | 8/2018 |
| CN | 108604733 A | 9/2018 |
| CN | 110115823 A | 8/2019 |
| CN | 110687816 A | 1/2020 |
| CN | 110765974 A | 2/2020 |
| CN | 110799927 A | 2/2020 |
| CN | 111108408 A | 5/2020 |
| CN | 111414843 A | 7/2020 |
| CN | 111430443 A | 7/2020 |
| CN | 111476058 A | 7/2020 |
| CN | 111552387 A | 8/2020 |
| CN | 111638506 A | 9/2020 |
| CN | 111650582 A | 9/2020 |
| CN | 211743382 U | 10/2020 |
| CN | 112164871 A | 1/2021 |
| CN | 112363156 A | 2/2021 |
| CN | 112421207 A | 2/2021 |
| CN | 112445324 A | 3/2021 |

OTHER PUBLICATIONS

Jia, Xiuqian, "Research on deep neural network gesture recognition algorithm for FMCW radar," Master's Thesis, Mar. 25, 2020, Chongqing University of Posts and Telecommunications, Nan'An, Chongqing, China. English Abstract.

Yu, Anyu, "Research on dynamic gesture recognition method based on FMCW radar," Master's Thesis, May 2019, Beijing University of Technology, Beijing, China. English Abstract.

Liu, Duo, "Research on gesture recognition method based on 77GHZ millimeter wave radar," Master's Thesis, Jun. 2019, Harbin Institute of Technology, Harbin, Heilongjiang, China. English Abstract.

Li, Chuyang, "Research on hand gesture recognition algorithm based on millimeter-wave radar," Master's Thesis, Jun. 2020, University of Electronic Science and Technology of China, Chengdu, Sichuan, China. English Abstract.

Zhang, Xuhao, "Research on hand gesture recognition based on 77GHZ millimeter wave radar," Doctoral Dissertation, May 24, 2019, Southeast University, Jiangsu, Nanjing, China. English Abstract.

Zhang, Zhenyuan, "Research on key technologies of micro hand gesture recognition based on millimeter wave radar," Doctoral Dissertation, Dec. 2019, Chongqing University of Posts and Telecommunications, Nan'An, Chongqing, China. English Abstract.

* cited by examiner (a)

(b)

(c)

(d)

(a)

(c)

(b)

(d)

INTERACTIVE CONTROL APPARATUS AND INTERACTIVE SYSTEM

CROSS-REFERENCE TO RELATED APPLICATIONS

This is a National Phase Application filed under 35 U.S.C. 371 as a national stage of PCT/CN2021/102070 filed on Jun. 24, 2021, the content of which is incorporated herein by reference in its entirety.

TECHNICAL FIELD

The present disclosure relates to the field of human-computer interaction technology, and in particular relates to an interactive control apparatus and an interactive system.

BACKGROUND

With the rapid development of 5G mobile communication and Internet of Things technologies, intelligent interactive control also enters a stage of rapid development. Various devices in office scenarios and household scenarios can be connected together, and controlled to enable information interaction through the Internet. Current human-computer interactive control is almost all based on contact keys or touch control, which provides no effective solution for the conditions of inconvenient contact control, unfriendly interaction operation and low flexibility.

SUMMARY

Some embodiments of the present disclosure provide an interactive control apparatus and an interactive system.

In a first aspect, an embodiment of the present disclosure provides an interactive control apparatus, including:
an antenna array configured to transmit a radar signal and receive a reflected echo signal;
a data processing assembly configured to determine, according to the radar signal and the echo signal, a body action and a corresponding control instruction, and output the control instruction to a terminal device; and
a display assembly configured to display the determined body action and/or control instruction.

In some embodiments, the data processing assembly is further configured to mix and analyze the radar signal and the echo signal to obtain reflection object information, and recognize the body action according to the reflection object information to determine the corresponding control instruction; wherein the reflection object information includes at least one of distance information, speed information, or angle of arrival information.

In some embodiments, the radar signal is a frequency modulated continuous wave signal.

In some embodiments, the data processing assembly includes: a first processing core and a second processing core;
the first processing core is configured to perform analysis and computation according to a signal obtained by mixing the radar signal and the echo signal to generate the reflection object information, wherein the analysis and computation includes: at least one of one-dimensional fast Fourier transformation, two-dimensional fast Fourier transformation, or computation of an angle of arrival; and the second processing core is configured to perform chirp control on the radar signal to pre-train and generate a body action recognition network, and recognize the body action through the body action recognition network according to the reflection object information, and determine the corresponding control instruction.

In some embodiments, the data processing assembly includes: a low noise amplifier, a mixer, an intermediate frequency amplifier, an analog-to-digital converter, a digital front-end component, a cache, a power amplifier, a power divider, and a waveform generator;
wherein the low noise amplifier, the mixer, the intermediate frequency amplifier, the analog-to-digital converter, the digital front-end component, and the cache are connected to each other in sequence;
the waveform generator, the power divider, and the power amplifier are connected to each other in sequence; and
an input terminal of the mixer is further connected to the power divider, an input terminal of the low noise amplifier is connected to the antenna array, and an output terminal of the power amplifier is connected to the antenna array.

In some embodiments, the display assembly includes a display in which the antenna array is integrated, and the antenna array includes a reference electrode layer, a dielectric layer, and a radiation electrode layer sequentially stacked together.

In some embodiments, the display has a display region, and a peripheral region surrounding the display region; and the antenna array is integrated in the peripheral region, and the reference electrode layer and the radiation electrode layer each include a planar electrode.

In some embodiments, the display has a display region, and a peripheral region surrounding the display region; and the antenna array is integrated in the display region, and the reference electrode layer and the radiation electrode layer each include a metal mesh.

In some embodiments, the display is a liquid crystal display including a first display panel, a first polarizer on a display surface of the first display panel, and a second polarizer on a side of the first display panel distal to the first polarizer.

In some embodiments, the antenna array is attached to a side of the first polarizer distal to the display surface of the first display panel.

In some embodiments, the first display panel includes a color filter layer, a liquid crystal layer and a backplane sequentially stacked together; and
the antenna array is integrated between the first polarizer and the color filter layer.

In some embodiments, the display further includes a touch layer; and the touch layer is disposed between the color filter layer and the antenna array or between the color filter layer and the liquid crystal layer.

In some embodiments, the display is an OLED display including a second display panel, and a third polarizer on a display surface of the second display panel.

In some embodiments, the antenna array is attached to a side of the third polarizer distal to the display surface of the second display panel.

In some embodiments, the second display panel includes a thin film package layer and an OLED layer stacked together; and
the antenna array is integrated between the third polarizer and the thin film package layer.

In some embodiments, the display further includes a touch layer; and the touch layer is disposed between the thin film package layer and the antenna array, or between the third polarizer and the thin film package layer such that the antenna array is integrated in the touch layer.

In some embodiments, the interactive control apparatus further includes: a printed circuit board; and
  the data processing assembly is disposed on the printed circuit board, and the antenna array performs signal transmission with the data processing assembly through a flexible cable.

In some embodiments, the interactive control apparatus further includes: a printed circuit board; and
  the data processing assembly is disposed on the printed circuit board, and the antenna array is packaged in the data processing assembly.

In some embodiments, the display assembly includes: a routing gateway unit;
  the routing gateway unit is configured to receive media data; and
  the display assembly is further configured to display according to the media data.

In a second aspect, an embodiment of the present disclosure provides an interactive system, including: a terminal device and an interactive control apparatus;
  wherein the interactive control apparatus is the interactive control apparatus according to any one of the above embodiments; and
  the terminal device is configured to operate according to the control instruction output from the interactive control apparatus.

BRIEF DESCRIPTION OF DRAWINGS

Accompanying drawings are provided for further understanding of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art through detailed description of the exemplary embodiments with reference to the accompanying drawings, in which.

DETAIL DESCRIPTION OF EMBODIMENTS

To improve understanding of technical solutions of the present disclosure for those skilled in the art, the interactive control apparatus and the interactive system of the present disclosure will be described below in detail in conjunction with the accompanying drawings.

Example embodiments will be described more sufficiently below with reference to the accompanying drawings, but which may be embodied in different forms and should not be construed as limited to the forms set forth herein. Rather, these embodiments are provided so that this disclosure will be thorough and complete, and will fully convey the scope of the present disclosure to those skilled in the art.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "made of . . . " specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another. Thus, a first element, component, or assembly discussed below could be termed a second element, component, or assembly without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense unless expressly so defined herein.

Figure 1:
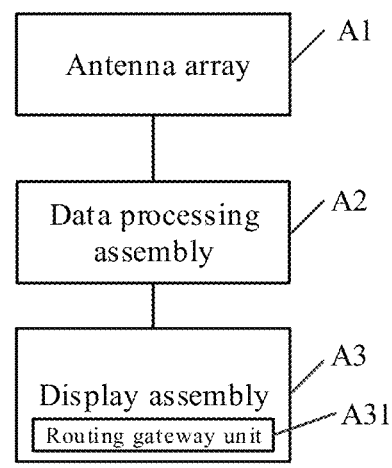
FIG. 1 is a schematic structural diagram of an interactive control apparatus according to an embodiment of the present disclosure.

FIG. 1 is a schematic structural diagram of an interactive control apparatus according to an embodiment of the present disclosure. As shown in FIG. 1, the interactive control apparatus includes: an antenna array A1, a data processing assembly A2, and a display assembly A3.

Specifically, the antenna array is configured to transmit a radar signal and receive a reflected echo signal; and the data processing assembly is configured to determine, according to the radar signal and the echo signal, a body action and a corresponding control instruction, and output the control instruction to a terminal device.

The display assembly is configured to display the determined body action and/or control instruction.

The antenna array includes a plurality of antenna units divided into a plurality of groups, each group being configured to transmit a radar signal and receive an echo signal.

In some embodiments, the interactive control apparatus and the terminal device are arranged in a one-to-one manner, or a one-to-many manner, or a many-to-one manner.

In some embodiments, the data processing assembly is specifically configured to mix and analyze the radar signal and the echo signal to obtain reflection object information, and recognize the body action according to the reflection object information to determine the corresponding control instruction. The reflection object information includes at least one of distance information, speed information, or angle of arrival (i.e., arrival angle) information. In some embodiments, the radar signal is a frequency modulated continuous wave (FMCW) signal.

Specifically, millimeter wave radars are divided into two categories, namely pulse radars and continuous wave radars according to the types of transmitted signals. The pulse radars transmit periodic high-frequency pulses, and the continuous wave radars transmit continuous wave signals, including single frequency continuous wave (CW) signals or frequency modulated continuous wave signals. The frequency modulation modes for frequency modulated continuous wave signals include triangular wave, sawtooth wave, code modulation or noise frequency modulation, or the like. In the foregoing embodiment, in the case where the radar signal is a frequency modulated continuous wave signal, the antenna array transmits a frequency modulated continuous wave signal with a varied frequency within a sweep period. Since an echo signal reflected by an object has a certain frequency difference from the transmitted radar signal, distance information between the object and the antenna array and the like can be obtained by measuring the frequency difference.

In some embodiments, a correspondence relationship between body actions and control instructions is obtained or configured in advance. The correspondence relationship between body actions and control instructions may be established in a one-to-one manner, or a correspondence relationship between body actions and control instructions of a single terminal device may be established, or a correspondence relationship between a single body action and control instructions of different terminal devices may be established.

In some embodiments, the interactive control apparatus further includes a printed circuit board (PCB). Correspondingly, in some embodiments, the data processing assembly is disposed on the printed circuit board, and the antenna array performs signal transmission with the data processing assembly through a flexible cable. To achieve a relatively low signal loss, an anisotropic conductive film (ACF) adhesive material with gold ball particles each have a relatively large diameter (e.g., a diameter greater than 10 um) may be used for gluing. Alternatively, in some embodiments, the data processing assembly is disposed on the printed circuit board, and the antenna array is packaged in the data processing assembly. The printed circuit board may be a high frequency circuit board, and the antenna array may be packaged inside the data processing assembly based on the Antenna in Package (AiP) technology. In some embodiments, the interactive control apparatus is installed inside the terminal device. In this case, an aperture (i.e., an opening or a hole) is formed in an installation position of the terminal device corresponding to a sensing region of the antenna array to reserve a transmission path, so as to prevent a metal shell of the terminal device from blocking transmission of millimeter waves.

In some embodiments, the data processing assembly and the antenna array form a millimeter wave radar subsystem, and correspondingly, the display assembly corresponds to a display subsystem.

In some embodiments, the display assembly A3 includes a routing gateway unit A31. The routing gateway unit A31 is configured to receive media data; and correspondingly, the display assembly A3 is further configured to display according to the media data received by the routing gateway unit A31.

In some embodiments, the display assembly further includes a display, a display drive unit, a chip timing control unit, a signal adaptation unit, and the like. The media data received by the routing gateway unit is transmitted to the signal adaptation unit for stream decoding, and then driven and controlled by the timing control unit according to a certain timing logic to form a display effect on the display.

In some embodiments, the interactive control apparatus shares a display assembly with the terminal device.

An embodiment of the present disclosure provides an interactive control apparatus which forms, based on an antenna array and a data processing assembly, a millimeter wave radar through which non-contact control is implemented, and determines, through capture and recognition of a body action, a corresponding control instruction sent to a terminal device so that the terminal device executes a corresponding command response, thereby implementing an interactive operation.

Figure 2:
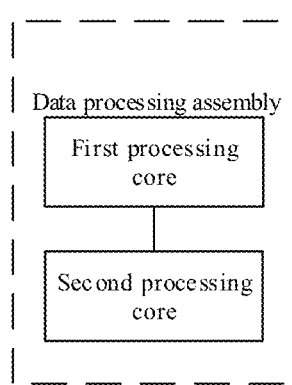
FIG. 2 is a schematic structural diagram of a data processing assembly according to an embodiment of the present disclosure.

FIG. 2 is a schematic structural diagram of a data processing assembly according to an embodiment of the present disclosure. As shown in FIG. 2, this data processing assembly is a specific optional implementation of the data processing assembly shown in FIG. 1. Specifically, the data processing assembly includes: a first processing core and a second processing core.

The first processing core is configured to perform analysis and computation according to a signal obtained by mixing the radar signal and the echo signal to generate the reflection object information. The analysis and computation includes: at least one of one-dimensional fast Fourier transformation (1D FFT), two-dimensional fast Fourier transformation (2D FFT), or computation of an angle of arrival (AOA). Through the 1D FFT and 2D FFT, corresponding distance information and speed information can be obtained, and through the computation of AOA, corresponding AOA information can be obtained.

In some embodiments, the first processing core is further configured to determine a valid echo signal based on a peak search algorithm and a constant false-alarm rate (CFAR) algorithm prior to the computation of AOA.

The second processing core is configured to perform chirp control on the radar signal to pre-train and generate a body action recognition network, and recognize the body action through the body action recognition network according to the reflection object information, and determine the corresponding control instruction. The term "chirp" refers to the characteristic that an instantaneous frequency of signal varies over time. In some embodiments, the radar signal is a frequency modulated continuous wave signal, and correspondingly, the second processing core is configured to configure a chirp parameter of the frequency modulated continuous wave signal. In some embodiments, the body action recognition network may be independently configured as a gesture recognition network for accurate recognition of gestures. In some embodiments, the body action recognition network is a convolutional neural network that may be based on a Torch architecture, a Pytorch architecture, a VGG architecture, or the like. The convolutional neural network has fewer parameters, faster determination speed, and higher determination accuracy, and is particularly suitable for image recognition. It should be noted that the recognition network may adopt a convolutional neural network model or any other neural network model, which is also applicable to the technical solutions of the present application and will not be described in detail here.

In some embodiments, the first processing core may adopt a DSP processing core, and the second processing core may adopt an ARM processing core.

Figure 3:
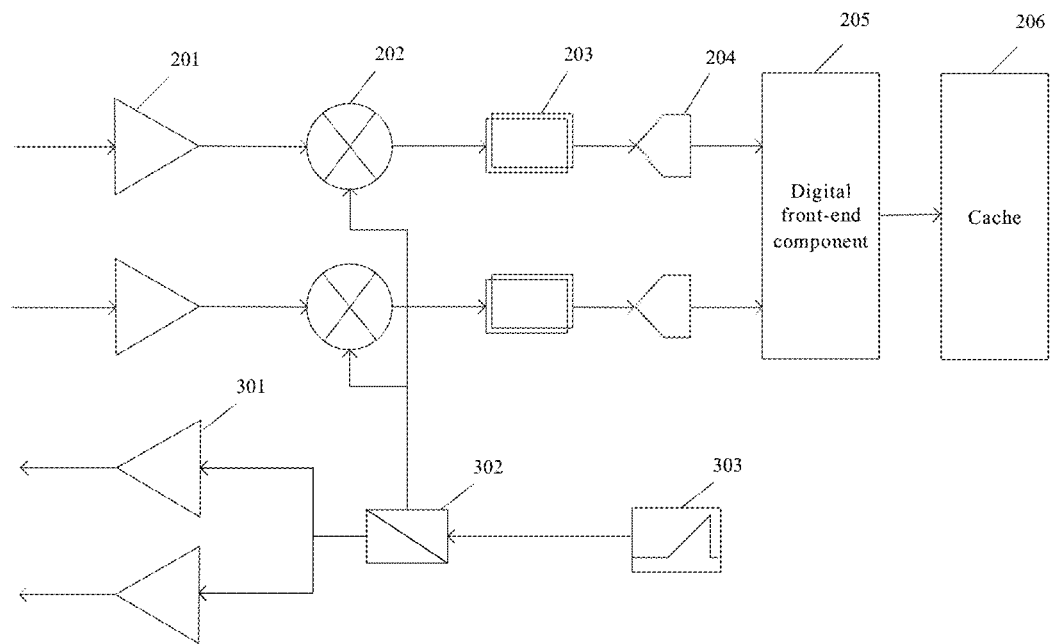
FIG. 3 is an equivalent circuit diagram of another data processing assembly according to an embodiment of the present disclosure.

FIG. 3 is an equivalent circuit diagram of another data processing assembly according to an embodiment of the present disclosure. As shown in FIG. 3, this data processing assembly is a specific optional implementation of the data processing assembly shown in FIG. 1. Specifically, the data processing assembly includes: a low noise amplifier 201, a mixer 202, an intermediate frequency amplifier 203, an analog-to-digital converter 204, a digital front end component 205 (a sampling filter), a cache 206, a power amplifier 301, a power divider 302, and a waveform generator 303, the arrows in the figure indicating a signal transmission direction.

The low noise amplifier 201, the mixer 202, the intermediate frequency amplifier 203, the analog-to-digital converter 204, the digital front-end component 205, and the cache 206 are connected to each other in sequence. The waveform generator 303, the power divider 302, and the power amplifier 301 are connected to each other in sequence. An input terminal of the mixer 202 is connected to the low noise amplifier 201 as well as the power divider 302. An input terminal of the low noise amplifier 201 is connected to the antenna array, and an output terminal of the power amplifier 301 is connected to the antenna array. The data processing assembly may include a plurality of transceiver links, that is, may include multiple sets of low noise amplifier 201, mixer 202, intermediate frequency amplifier 203, analog-to-digital converter 204 (a case including two sets is exemplarily shown in the figure) on a corresponding receiving side, and may include a plurality of power amplifiers 301 (a case including two power amplifiers 301 is exemplarily shown in the figure) on a corresponding transmitting side. In some embodiments, a phase shifter is further connected between each power amplifier 301 and the power divider 302. In some embodiments, a filter is further connected between each mixer 202 and a corresponding intermediate frequency amplifier 203.

The waveform generator 303 generates a radar signal, a part of the radar signal is sent to the mixer 202 through the power divider 302, a part of the radar signal is sent via the power amplifier 301 to the antenna array through the power divider 302, and then sent out through a corresponding antenna unit in the antenna array. An echo signal reflected from an object encountered by the radar signal is received by a corresponding antenna unit in the antenna array, amplified by the low noise amplifier 201, mixed with part of the output of the power divider 302 in the mixer 202 to generate an intermediate frequency signal, and then converted into corresponding data by the intermediate frequency amplifier 203, the analog-to-digital converter 204 and the digital front-end component 205 and stored in the cache 206.

Figure 4:
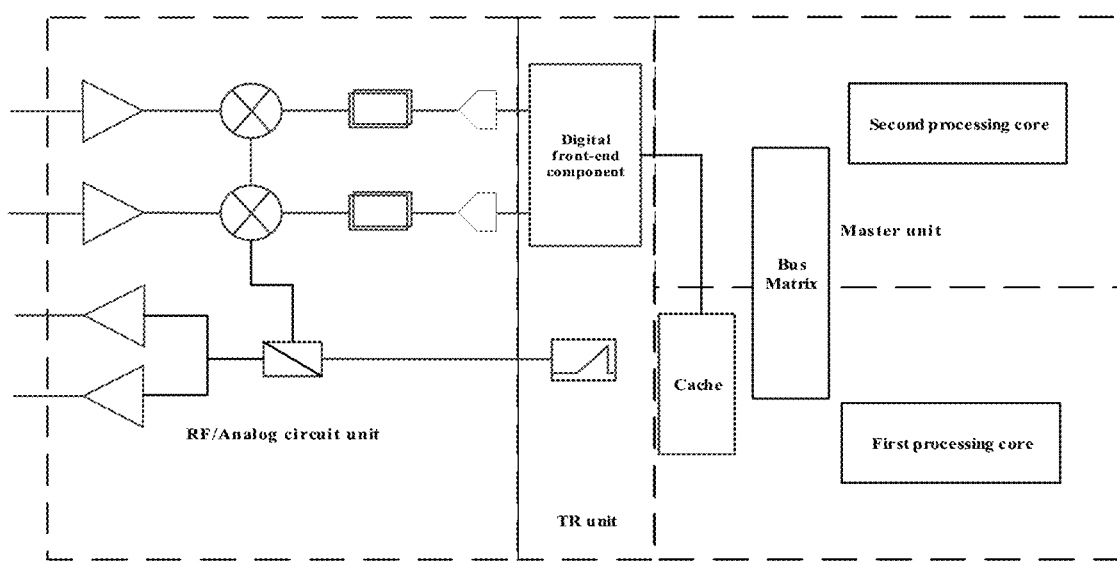
FIG. 4 is a schematic structural diagram of yet another data processing assembly according to an embodiment of the present disclosure.

FIG. 4 is a schematic structural diagram of yet another data processing assembly according to an embodiment of the present disclosure. As shown in FIG. 4, this data processing assembly is a specific optional implementation based on the data processing assemblies shown in FIGS. 2 and 3. Specifically, the data processing assembly includes: a low noise amplifier, a mixer, an intermediate frequency amplifier, an analog-to-digital converter, a digital front-end component, a cache, a power amplifier, a power divider, a waveform generator, a first processing core, and a second processing core.

Based on functions of the components, the data processing assembly may be divided into a plurality of units, including: a radio frequency/analog circuit (RF/Analog) unit, a transceiver (TR) unit, a signal processing (DSP) unit and a control (or master) unit. As shown in FIG. 4, the RF/Analog unit includes a low noise amplifier, a mixer, an intermediate frequency amplifier, an analog-to-digital converter, a power amplifier, and a power divider, the TR unit includes a digital front-end component and a waveform generator, the DSP unit includes a cache and a first processing core, and the master unit includes a second processing core. The components in the master unit and the DSP unit may perform communication and process control based on a bus matrix, and a signal transmission direction inside the RF/Analog unit is shown in FIG. 3.

In some embodiments, the RF/Analog unit further includes a general purpose analog-to-digital converter (GPADC), an oscillator (OSC), a temperature controller, etc. The DSP unit further includes a cyclic redundancy check (CRC) component, a direct memory access (DMA) component, a low voltage differential signaling (LVDS) interface, a Hardware in the Loop (HIL) component, a radar data memory, and a hardware accelerator connected to the cache. The master unit further includes a direct memory access component, a serial peripheral interface (SPI), a quad serial peripheral interface (QSPI), a bus interface, and a debug serial port. A mailbox assembly based on a mailbox synchronous communication mechanism is further provided between the master unit and the DSP unit.

In some embodiments, the data processing assembly may adopt an IWR6843 chip or a VYYR7201-A0 chip or the like.

In some embodiments, the data processing assembly may include only a low noise amplifier, a mixer, an intermediate frequency amplifier, a power amplifier, and a power divider, and may be a BGT60TR13 chip, for example. Other components, such as the analog-to-digital converter, the digital front-end component, the cache, and the waveform generator, are additionally provided.

Therefore, based on the data processing assembly in each of the above embodiments, processing of the corresponding signals and data based on a plurality of processing cores can be implemented, where the first processing core performs a series of analysis and computation on intermediate frequency signals, and the second processing core implements body action recognition through a trainable body action recognition network, thereby improving the accuracy of body action recognition.

In some embodiments, the display assembly includes a display in which the antenna array is integrated, and the antenna array includes a reference electrode layer, a dielectric layer, and a radiation electrode layer sequentially stacked together.

In some embodiments, the reference electrode layer is also called a ground layer, which is connected to a ground signal (which may be a direct current (DC) low-level signal), and can lead static electricity and lightning signals generated during use to the outside, thereby preventing an antenna from being damaged and affected in performance due to breakdown. The radiation electrode layer is also called as a radiation layer, which can convert an electrical signal input through a transmission line into an electromagnetic wave signal and radiate the electromagnetic wave signal outwards, or which can convert an external electromagnetic wave signal into an electrical signal and output the electrical signal to the terminal device through the transmission line to implement wireless signal transmission. The dielectric layer may be a dielectric substrate, which is positioned between the reference electrode layer and the radiation electrode layer, and may be a low-loss dielectric material playing a role in supporting the reference electrode layer and the radiation electrode layer. In some embodiments, the antenna array may be integrated in the display by in-screen integration and out-screen integration, and the in-screen integration further includes on-screen integration and under-screen integration, or the like.

In some embodiments, the reference electrode layer and the radiation electrode layer are each made of a material including: aluminum, copper, or molybdenum.

In some embodiments, the display has a display region, and a peripheral region surrounding the display region. The antenna array may be disposed at any position in the display region or the peripheral region. In some embodiments, in order to reduce signal transmission loss, the antenna array is disposed at a position near an edge of the display to shorten a length of a signal lead-out wire.

Figure 5:
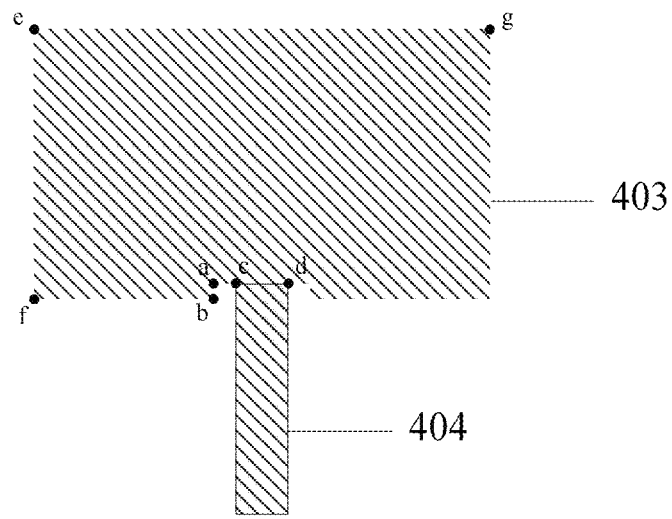
FIG. 5 is a schematic plan view of an antenna unit according to an embodiment of the present disclosure.
Figure 6:
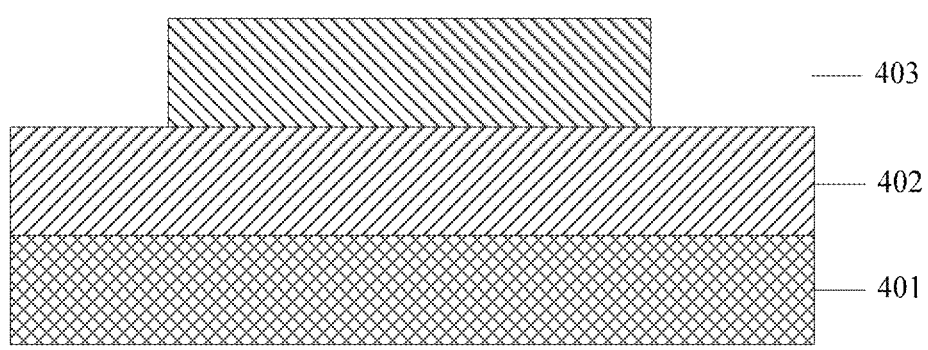
FIG. 6 is a schematic cross-sectional structure view of the antenna unit shown in FIG. 5.

FIG. 5 is a schematic plan view of an antenna unit according to an embodiment of the present disclosure, and FIG. 6 is a schematic cross-sectional structure view of the antenna unit shown in FIG. 5. The antenna array includes a plurality of antenna units. In a specific optional implementation of the antenna array integrated out of screen, specifically, the antenna array is integrated in the peripheral region, and as shown in FIGS. 5 and 6, each antenna unit includes a reference electrode layer 401, a dielectric layer 402, and a radiation electrode layer 403. The reference electrode layer 401 and the radiation electrode layer 403 each include a planar electrode. Each antenna unit further includes a feeder line 404 connected to the radiation electrode layer 403. The feeder line 404 may transmit an electrical signal generated by the data processing assembly to the radiation electrode layer 403, or transmit the electromagnetic signal received by the radiation electrode layer 403 to the data processing assembly, thereby implementing signal transmission. In some embodiments, the feeder line 404 may be disposed in the same layer as the radiation electrode layer 403.

In some embodiments, exemplarily, the antenna unit may have the following side lengths: an ab side of 0.15 mm, an ac side of 0.01 mm, a cd side of 0.3 mm, an ef side of 1.9 mm, and an eg side of 2.5 mm. It should be noted that the above exemplary dimensions are merely a specific optional implementation of the embodiment of the present disclosure, the length of each side in the drawings is not strictly proportional to the above values, and in implementations, an appropriate side length scheme may be selected according to actual needs.

Figure 7:
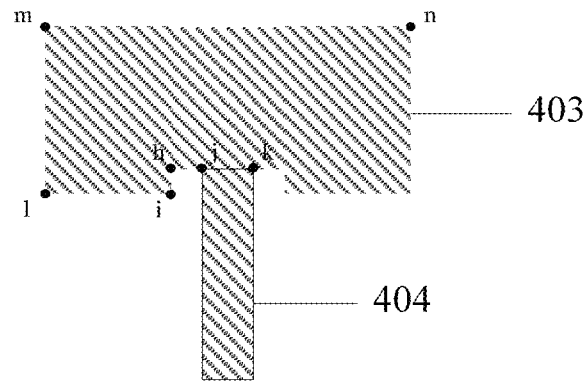
FIG. 7 is a schematic plan view of another antenna unit according to an embodiment of the present disclosure.
Figure 8:
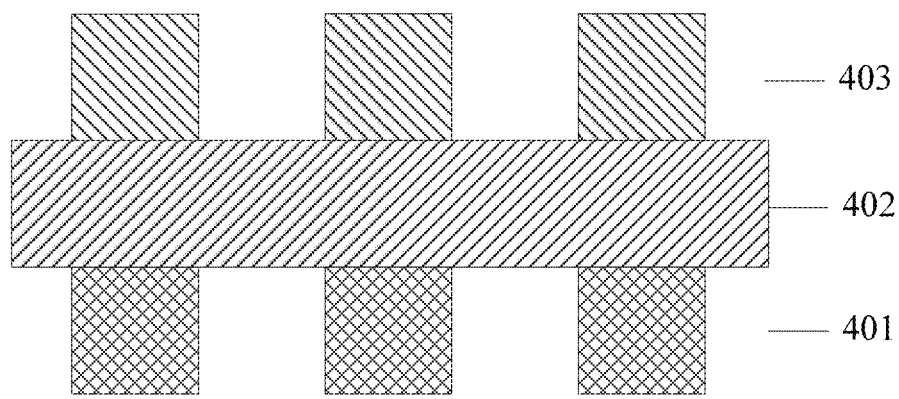
FIG. 8 is a schematic cross-sectional structure view of the antenna unit shown in FIG. 7.

FIG. 7 is a schematic plan view of another antenna unit according to an embodiment of the present disclosure, and FIG. 8 is a schematic cross-sectional structure view of the antenna unit shown in FIG. 7. The antenna array includes a plurality of antenna units. In a specific optional implementation of the antenna array integrated in screen, specifically, the antenna array is integrated in the display region, and as shown in FIGS. 7 and 8, the antenna unit may adopt a cycloolefin polymer (COP) substrate and include a reference electrode layer 401, a dielectric layer 402, and a radiation electrode layer 403. The reference electrode layer 401 and the radiation electrode layer 403 each include a metal mesh which may have a metal line with a width of 10 μm, a mesh side with a length of 150 m, and may be made of a metal material of copper. The antenna unit further includes a feeder line 404.

In some embodiments, exemplarily, the antenna unit may have the following side lengths: an hi side of 0.25 mm, an hj side of 0.45 mm, a jk side of 0.3 mm, an ml side of 1.15 mm, and an mn side of 1.7 mm. It should be noted that the above exemplary dimensions are merely a specific optional implementation of the embodiment of the present disclosure, the length of each side in the drawings is not strictly proportional to the above values, and in implementations, an appropriate side length scheme may be selected according to actual needs.

Figure 9:
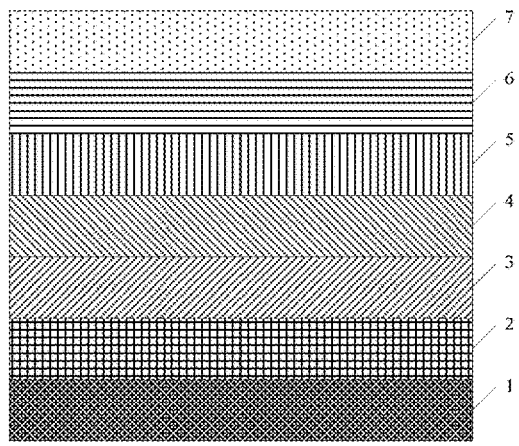
FIG. 9 is a schematic structural diagram of a display assembly according to an embodiment of the present disclosure.
Figure 9:
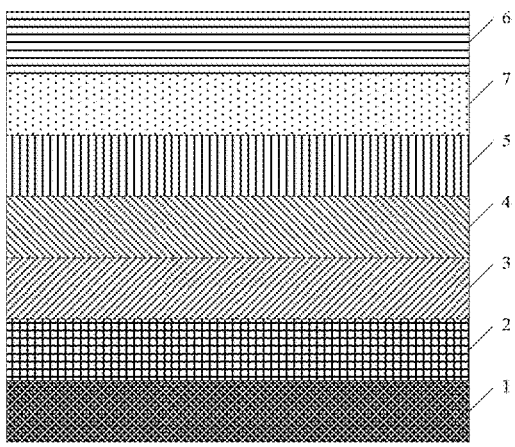
Figure 9:
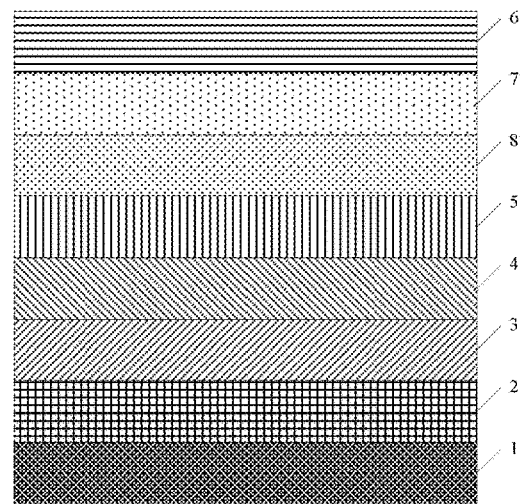
Figure 9:
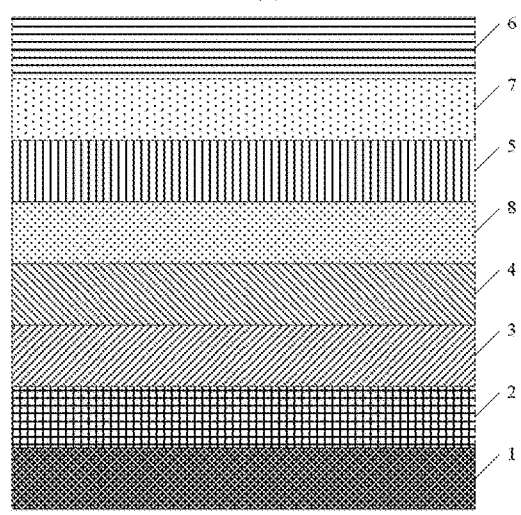

FIG. 9 is a schematic structural diagram of a display assembly according to an embodiment of the present disclosure. Based on the antenna array shown in FIGS. 7 and 8, in a specific optional implementation of the antenna array integrated in screen, specifically, the display is a liquid crystal display which, as shown in FIG. 9, includes a first display panel, a first polarizer 6 on a display surface of the first display panel, and a second polarizer 2 on a side of the first display panel distal to the first polarizer 6. The first polarizer 6 may be provided to reduce reflection of ambient light. In some embodiments, as shown in the figure, the display further includes a backlight source 1 located on a side of the second polarizer distal to the first display panel, and the first display panel includes a color filter layer 5, a liquid crystal layer 4 and a backplane 3 sequentially stacked together.

Referring to FIG. 9, as shown in (a), in a specific optional implementation of the antenna array integrated on screen, the antenna array 7 is attached to a side of the first polarizer 6 distal to the display surface of the first display panel; as shown in (b), in a specific optional implementation of the antenna array integrated under screen, the antenna array 7 is integrated between the first polarizer 6 and the color filter layer 5. The antenna array 7 is integrated on a side of the first polarizer 6 proximal to the display surface of the first display panel. Based on the characteristic of the first polarizer 6 reducing reflection of ambient light, external interference can be reduced.

In some embodiments, the display further includes a touch layer 8. In a specific optional implementation of the antenna array integrated under screen, as shown in (c), the touch layer 8 is disposed between the color filter layer 5 and the antenna array 7, or as shown in (d), the touch layer 8 is disposed between the color filter layer 5 and the liquid crystal layer 4. Therefore, the interactive control apparatus in the embodiments of the present disclosure can not only realize non-contact interactive control based on the antenna array integrated in screen, but also be compatible with a mode of controlling the terminal device through touch control.

Figure 10:
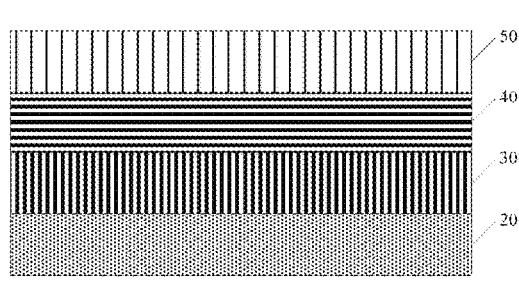
FIG. 10 is a schematic structural diagram of another display assembly according to an embodiment of the present disclosure.
Figure 10:
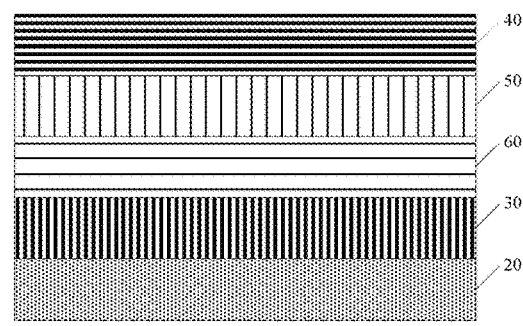
Figure 10:
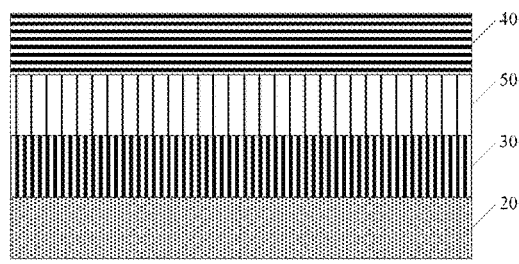
Figure 10:
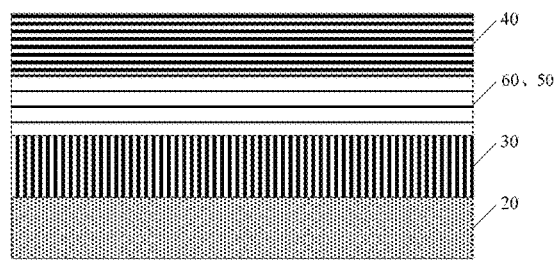

FIG. 10 is a schematic structural diagram of another display assembly according to an embodiment of the present disclosure. Based on the antenna array shown in FIGS. 7 and 8, in a specific optional implementation of the antenna array integrated in screen, specifically, the display is an organic light-emitting diode (OLED) display which, as shown in FIG. 10, includes a second display panel, and a third polarizer 40 on a display surface of the second display panel. In some embodiments, as shown in the figure, the second display panel includes a thin film package layer 30 and an OLED layer 20 stacked together.

Referring to FIG. 10, as shown in (a), in a specific optional implementation of the antenna array integrated on screen, the antenna array 50 is attached to a side of the third polarizer 40 distal to the display surface of the second display panel; and as shown in (b), in a specific optional implementation of the antenna array integrated under screen, the antenna array 50 is integrated between the third polarizer 40 and the thin film package layer 30.

In some embodiments, the display further includes a touch layer 60. As shown in (c), the touch layer 60 is disposed between the thin film package layer 30 and the antenna array 50, or as shown in (d), the touch layer is integrated between the third polarizer 40 and the thin film package layer 30, and the antenna array 50 is integrated in the touch layer 60.

Figure 11:
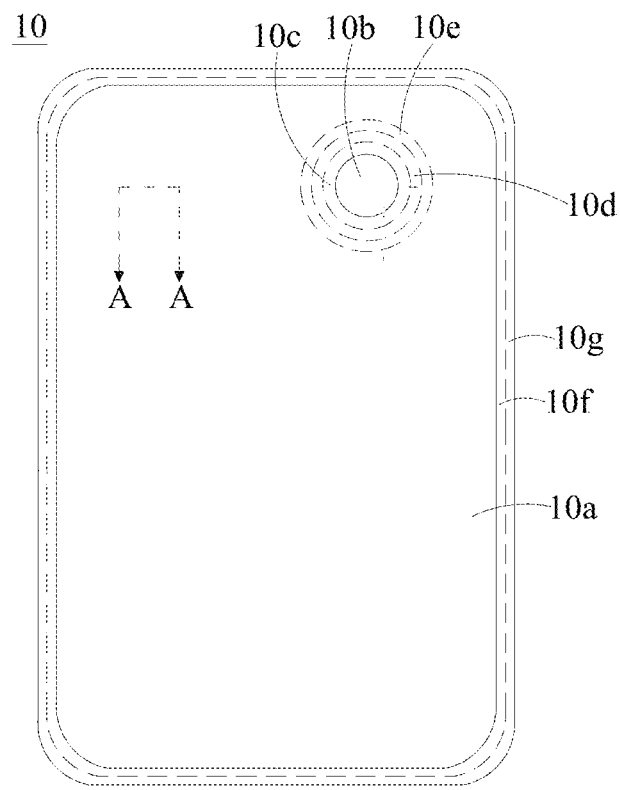
FIG. 11 is a schematic plan view of a second display panel according to an embodiment of the present disclosure.

FIG. 11 is a schematic plan view of a second display panel according to an embodiment of the present disclosure. Specifically, as shown in FIG. 11, the second display panel 10 may have a display region 10*a*, an opening region 10*b*, and a transition region 10*c* located between the display region 10*a* and the opening region 10*b*. The transition region 10*c* is disposed around the opening region 10*b*. It should be noted that the second display panel 10 may further include an isolation region 10*d*, an inner ring wiring region 10*e*, a peripheral wiring region 10*f*, and a peripheral package region 10*g*. The isolation region 10*d* is located between the display region 10*a* and the transition region 10*c* and disposed around the transition region 10*c*. The inner ring wiring region 10*e* is located between the isolation region 10*d* and the display region 10*a*, and disposed around the isolation region 10*d*. Further, the peripheral wiring region 10*f* may be disposed around the display region 10*a*, or disposed on both sides of the display region 10*a*. The peripheral package region 10*g* may package the entire second display panel 10 at an outermost edge of the entire base substrate.

Specifically, the second display panel may include a base substrate, a driving circuit layer, a display device (OLED) layer, and a thin film package layer. The base substrate may be a flexible substrate to improve flexibility of the second display panel 10, so that the second display panel 10 can have properties of being bendable, being foldable, and the like, thereby expanding the application range of the second display panel 10. However, the present disclosure is not limited thereto. The base substrate may be configured to be rigid, and the specific properties of the base substrate may be determined according to the actual product requirements.

In addition, the base substrate may have a single-layer structure or a multi-layer structure.

Figure 12:
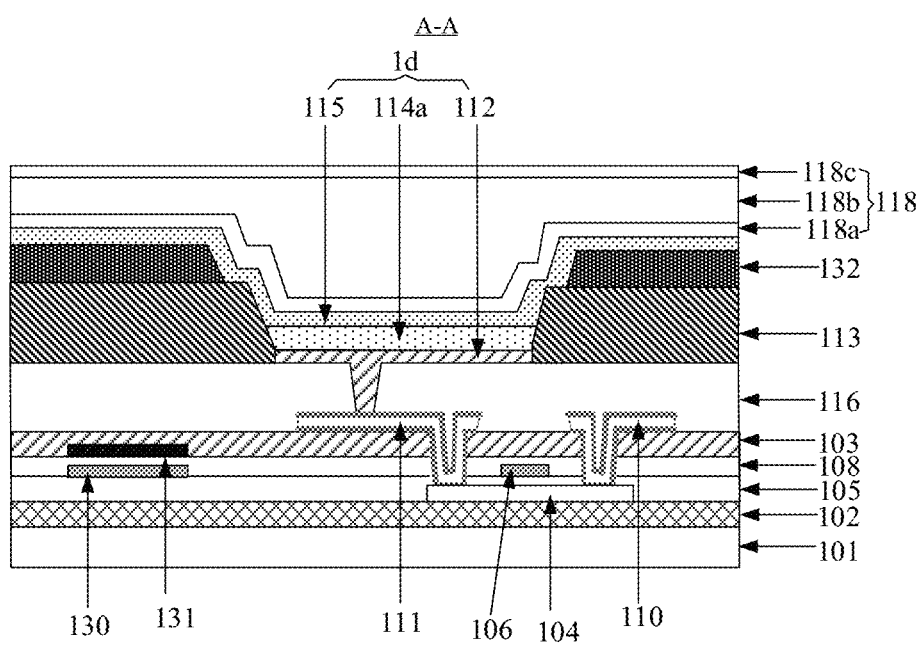
FIG. 12 is a sectional view of the second display panel shown in FIG. 11 in a direction A-A.

FIG. 12 is a sectional view of the second display panel shown in FIG. 11 in a direction A-A. As shown in FIG. 12, in some embodiments, the base substrate may include a polyimide layer 101 and a buffer layer 102 sequentially stacked on each other. In other embodiments, the base substrate may include a plurality of composite layers each formed by polyimide layers 101 and buffer layers 102 sequentially stacked on each other. The buffer layer 102 may be made of a material such as silicon nitride, silicon oxide, or the like, so as to reach the effect of blocking water, oxygen and alkali ions. It should be noted that the structure of the base substrate is not limited thereto, and may be determined according to actual requirements.

It should be noted that in order to facilitate the subsequent processing of the desired components in each region of the second display panel 10, various regions may be defined on the base substrate in advance. For example, the display region 10*a*, the transition region 10*c*, the opening region 10*b*, the isolation region 10*d*, the inner ring wiring region 10*e*, the peripheral wiring region 10*f*, and the peripheral package region 10*g* may be defined on the base substrate. That is, the entire second display panel 10 is divided into the display region 10*a*, the transition region 10*c*, the opening region 10*b*, the isolation region 10*d*, the inner ring wiring region 10*e*, the peripheral wiring region 10*f*, and the peripheral package region 10*g*.

In some embodiments, as shown in FIG. 12, the driving circuit layer may be formed on the base substrate. Specifically, the driving circuit layer may be formed on the buffer layer 102 of the base substrate. The driving circuit layer may include an interlayer dielectric layer 103 in the display region 10*a* and the transition region 10*c*. The interlayer dielectric layer 103 is made of an inorganic material, such as silicon oxide, silicon nitride, or the like, so as to reach the effect of blocking water, oxygen and alkali ions. It will be appreciated that when the second display panel 10 has the isolation region 10*d*, the inner ring wiring region 10*e*, the peripheral wiring region 10*f*, and the peripheral package region 10*g*, the interlayer dielectric layer 103 is further provided in the isolation region 10*d*, the inner ring wiring region 10*e*, the peripheral wiring region 10*f*, and the peripheral package region 10*g*.

Specifically, a part of the driving circuit layer in the display region 10*a* may include a thin film transistor and a capacitor structure.

As shown in FIG. 12, the thin film transistor may be of a top gate type, and may include an active layer 104, a first gate insulation layer 105, a gate electrode 106, a second gate insulation layer 108, an interlayer dielectric layer 103, a source electrode 110, and a drain electrode 111. Specifically, the active layer 104 may be formed on the buffer layer 102, the first gate insulation layer 105 covers the buffer layer 102 and the active layer 104, the gate electrode 106 is formed on a side of the first gate insulation layer 105 distal to the active layer 104, the second gate insulation layer 108 covers the gate electrode 106 and the first gate insulation layer 105, the interlayer dielectric layer 103 covers the second gate insulation layer 108, the source electrode 110 and the drain electrode 111 are formed on a side of the interlayer dielectric layer 103 distal to the base substrate and respectively located on two opposite sides of the gate electrode 106, and the source electrode 110 and the drain electrode 111 may respectively contact two opposite sides of the active layer 104 through vias (such as metal vias). It will be appreciated that the thin film transistor may alternatively be a bottom gate type.

As shown in FIG. 12, the capacitor structure may include a first electrode plate 130 and a second electrode plate 131. The first electrode plate 130 is disposed in the same layer as the gate electrode 106, and the second electrode plate 131 is disposed between the second gate insulation layer 108 and the interlayer dielectric layer 103 and opposite to the first electrode plate 130.

For example, the gate electrode 106, the first plate 130 and the second plate 131 may be made of a material including a metal material or an alloy material, such as molybdenum, aluminum, titanium, or the like. The source electrode 110 and the drain electrode 111 may include a metal material or an alloy material, such as a metal single-layer or multi-layer structure formed of molybdenum, aluminum, titanium, or the like. For example, the multi-layer structure is a multi-metal layer stack, such as a three metal layer stack of titanium, aluminum and titanium (Al/Ti/Al), or the like.

It should be noted that the aforementioned first gate insulation layer 105 and the second gate insulation layer 108 are also located in the transition region 10*c*, the isolation region 10*d*, the inner ring wiring region 10*e*, the peripheral wiring region 10*f*, and the peripheral package region 10*g*.

As shown in FIG. 12, the display device is located in the display region, and may include a first electrode 112 and a pixel defining portion 113 sequentially formed on the interlayer dielectric layer 103. It will be appreciated that the display device may further include a light-emitting portion 114a and a second electrode 115.

Specifically, when the thin film transistor in the display region 10a is a top gate type, a planarization layer may be formed before manufacturing the display device, and the planarization layer may have a single-layer structure or a multi-layer structure. The planarization layer is typically made of an organic material, such as a photoresist, an acrylic-based polymer, a silicon-based polymer, or the like. As shown in FIG. 12, the planarization layer may include a planarization portion 116 that is located in the display region 10a, and formed between the interlayer dielectric layer 103 and the first electrode 112. The first electrode 112 may be electrically connected to the drain electrode 111 through a metal via, and the first electrode 112 may be an anode made of a material including ITO (indium tin oxide), indium zinc oxide (IZO), zinc oxide (ZnO), or the like. The pixel defining portion 113 may cover the planarization portion 116, and may be made of an organic material such as a photoresist, and a portion of the pixel defining portion 113 in the display region 10a may have a pixel opening exposing the first electrode 112. The light-emitting portion 114a is located in the pixel opening and formed on the first electrode 112. The light-emitting portion 114a may include a small molecule organic material or a polymer molecule organic material, which may be a fluorescent light-emitting material or a phosphorescent light-emitting material that can emit red light, green light, blue light, or white light, or the like. In addition, according to different practical needs and in different examples, the light-emitting portion 114a may further include an electron injection layer, an electron transport layer, a hole injection layer, a hole transport layer and/or other functional layers. The second electrode 115 covers the light-emitting portion 114a, and has a polarity opposite to that of the first electrode 112. The second electrode 115 may be a cathode made of a metal material such as lithium (Li), aluminum (Al), magnesium (Mg), silver (Ag), or the like.

It should be noted that, as shown in FIG. 12, the first electrode 112, the light-emitting portion 114a, and the second electrode 115 may form a light-emitting sub-pixel 1d. The portion of the display device in the display region 10a may include a plurality of light-emitting sub-pixels 1d arranged in an array. In addition, it should be noted that first electrodes 112 of respective light-emitting sub-pixels 1d are independent of each other, and second electrodes 115 of respective light-emitting sub-pixels 1d are connected to form an entire surface. That is, the second electrodes 115 form a one-piece structure on the second display panel 10, and are a common electrode shared by a plurality of display devices.

In some embodiments, as shown in FIG. 12, a support portion 132 may be further provided on a side of the pixel defining portion 113 distal to the interlayer dielectric layer 103, and the support portion 132 may function to support a protective film layer (not shown) to prevent the protective film layer from contacting the first electrode 112 or other traces to damage the first electrode 112 or other traces. It should be noted that the protective film layer is mainly provided during transfer of semi-finished products to avoid damages to the semi-finished products during the transfer. Specifically: a coverage protective film layer may be provided in the process of transferring a substrate on which the support portion 132 is formed to an evaporation line, and the protective film layer may be removed before evaporation of the light-emitting material.

For example, the support portion 132 may be made of the same material as the pixel defining portion 113, and the support portion 132 and the pixel defining portion 113 may be formed in a same patterning process. However, the present disclosure is not limited thereto, and the support portion 132 may be made of a material different from that of the support portion 132, and formed in a patterning process different from a patterning process in which the pixel defining portion 113 is formed.

As shown in FIG. 12, a thin film package layer 118 may include a first inorganic package thin film layer 118a, an organic package thin film layer 118b, and a second inorganic package thin film layer 118c sequentially stacked on each other. The first inorganic package thin film layer 118a packages the display device, and the organic package thin film layer 118b packages the display device. The second inorganic package thin film layer 118c packages the display device. The first inorganic package thin film layer 118a and the second inorganic package thin film layer 118c are configured to prevent water and oxygen from entering the light-emitting portion 114a in the display region 10a from the display side of the display device and the opening region 10b. The first inorganic package thin film layer 118a and the second inorganic package thin film layer 118c may be made of an inorganic material such as silicon nitride or silicon oxide. The organic package thin film layer 118b is configured to implement planarization to facilitate manufacture of the second inorganic package thin film layer 118c, and the organic package thin film layer 118b may be made of a material including an acrylic-based polymer, a silicon-based polymer, or the like.

In addition, the first inorganic package thin film layer 118a and the second inorganic package thin film layer 118c may be formed through a chemical vapor deposition process, but the present disclosure is not limited thereto, and a physical vapor deposition process or the like may be adopted. The organic package thin film layer 118b is formed through an inkjet printing process, but the present disclosure is not limited thereto, and a spraying process or the like may be adopted. In manufacturing the organic package thin film layer 118b, since the organic package material has a certain fluidity, a first blocking portion 117 may be provided to limit flow of the organic package material, thereby avoiding the problem of package failure caused by the organic package material flowing into the opening region 10b.

Therefore, an embodiment of the present disclosure provides an integration scheme of multiple millimeter wave radars, including: integrating an antenna array in a display, integrating a data processing assembly in a printed circuit board, and connecting the two with a flexible cable; and integrating the data processing assembly in the printed circuit board, and packaging the antenna array in the data processing assembly. Integrating the antenna array in the display further includes various scheme such as integrating the antenna array in the display out of screen, on screen, under screen, and the like. Different setting schemes are provided for displays of different specifications and displays with different display devices. For example, in a liquid crystal display including a first display panel, a first polarizer on a display surface of the first display panel, and a second polarizer on a side of the first display panel distal to the first polarizer, the first display panel includes a color filter layer, a liquid crystal layer and a backplane sequentially stacked together, where the antenna array may be attached to a side of the first polarizer distal to the display surface of the first display panel, or may be integrated between the first polarizer and the color filter layer, or may be disposed in the display with a touch layer. For another example, in an OLED display including a second display panel, and a third polarizer on a display surface of the second display panel, the second display panel includes a thin film package layer and an OLED layer stacked together, where the antenna array may be attached to a side of the third polarizer distal to the display surface of the second display panel, or may be integrated between the third polarizer and the thin film package layer. Therefore, through the efficient and integrated design of the millimeter wave radar with the display assembly and the terminal device, non-contact control is implemented, and the interactive control flexibility is improved.

An embodiment of the present disclosure further provides an interactive system, including: a terminal device, and the interactive control apparatus according to any one of the above embodiments. The terminal device is configured to operate according to a control instruction output from the interactive control apparatus. In some embodiments, the terminal device includes a device processor, a device actuator and other necessary parts and components.

The following describes the interactive control apparatus and the interactive system provided in the embodiments of the present disclosure in detail with reference to practical applications. Taking the application to an intelligent domestic scenario as an example, the terminal device corresponds to one of various types of intelligent domestic devices, and with the interactive control apparatus provided in the embodiments of the present disclosure, non-contact control of a single or a plurality of intelligent domestic devices can be implemented. The terminal device may include: a domestic television, an air conditioner, an electric lamp, an electronic curtain, a water heater, a cooker hood (or kitchen ventilator), a smart oven, a refrigerator, a stereo, an electronic door, or the like. The interactive control apparatus may be provided independently or in the corresponding terminal device, and may establish a one-to-one control, one-to-many control or many-to-one control relationship with the terminal devices.

Description will be given by taking an example in which the terminal device is a cooker hood, and the interactive control apparatus is disposed inside the cooker hood for one-to-one control.

The interactive control apparatus includes an antenna array, a data processing assembly and a display assembly. The antenna array is configured to transmit a radar signal and receive a reflected echo signal. Specifically, the radar signal is a frequency modulated continuous wave signal. The data processing assembly includes a low noise amplifier, a mixer, an intermediate frequency amplifier, an analog-to-digital converter, a digital front-end component, a cache, a power amplifier, a power divider, a waveform generator, a first processing core, and a second processing core. The display assembly is configured to display the determined body action and/or control instruction, and display an interactive interface of the cooker hood. The interactive control apparatus shares the display assembly with the cooker hood, the antenna array is integrated in a display of the display assembly, including in-screen integration or out-screen integration, and the in-screen integration further includes on-screen integration, under-screen integration, or the like.

Firstly, the waveform generator in the data processing assembly generates a radar signal and sends the radar signal to the mixer and the power amplifier through the power divider. After being processed by the power amplifier, the signal is sent to the antenna array to be transmitted to the outside. The low noise amplifier receives an echo signal received by the antenna array, the frequency mixer mixes the radar signal with the echo signal, and after a series of processing by the intermediate frequency amplifier, the analog-to-digital converter and the digital front-end component, corresponding data is stored in the cache. The first processing core performs analysis and computation on the data, including one-dimensional fast Fourier transformation, two-dimensional fast Fourier transformation, computation of an angle of arrival, and/or the like, to generate the reflection object information. The second processing core recognizes gestures through a pre-trained gesture recognition network based on the reflection object information, determines a control instruction expected by a user for the cooker hood, and sends the control instruction to the cooker hood through a corresponding interface. Then, the cooker hood executes a corresponding action. Specifically, for example, when a gesture is detected as staying in a defined sensing region for 3 seconds or more, the cooker hood is turned on, when a gesture is detected as rotating clockwise or counterclockwise, a wind power of the cooker hood is adjusted, and when a gesture is detected as left-right waving, the display interface is controlled to turn to another page, and so on.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. An interactive control apparatus, comprising:
    an antenna array configured to transmit a radar signal and receive a reflected echo signal;
    a data processing assembly configured to determine, according to the radar signal and the echo signal, a body action and a corresponding control instruction, and output the control instruction to a terminal device; and
    a display assembly configured to display the determined body action and/or control instruction;
    wherein the display assembly comprises a display in which the antenna array is integrated, and the antenna array comprises a reference electrode layer, a dielectric layer, and a radiation electrode layer sequentially stacked together.

2. The interactive control apparatus according to claim 1, wherein
    the data processing assembly is further configured to mix and analyze the radar signal and the echo signal to obtain reflection object information, and recognize the body action according to the reflection object information to determine the corresponding control instruction;
    wherein the reflection object information comprises at least one of distance information, speed information, or angle of arrival information.

3. The interactive control apparatus according to claim 2, wherein the radar signal is a frequency modulated continuous wave signal.

4. The interactive control apparatus according to claim 2, wherein the data processing assembly comprises: a first processing core and a second processing core;
- the first processing core is configured to perform analysis and computation according to a signal obtained by mixing the radar signal and the echo signal to generate the reflection object information, wherein the analysis and computation comprises: at least one of one-dimensional fast Fourier transformation, two-dimensional fast Fourier transformation, or computation of an angle of arrival; and
- the second processing core is configured to perform chirp control on the radar signal to pre-train and generate a body action recognition network, and recognize the body action through the body action recognition network according to the reflection object information, and determine the corresponding control instruction.

5. The interactive control apparatus according to claim 1, wherein the display has a display region, and a peripheral region surrounding the display region; and the antenna array is integrated in the peripheral region, and the reference electrode layer and the radiation electrode layer each comprise a planar electrode.

6. The interactive control apparatus according to claim 1, wherein the display has a display region, and a peripheral region surrounding the display region; and the antenna array is integrated in the display region, and the reference electrode layer and the radiation electrode layer each comprise a metal mesh.

7. The interactive control apparatus according to claim 6, wherein the display is a liquid crystal display comprising a first display panel, a first polarizer on a display surface of the first display panel, and a second polarizer on a side of the first display panel distal to the first polarizer.

8. The interactive control apparatus according to claim 7, wherein the antenna array is attached to a side of the first polarizer distal to the display surface of the first display panel.

9. The interactive control apparatus according to claim 7, wherein the first display panel comprises a color filter layer, a liquid crystal layer and a backplane sequentially stacked together; and
- the antenna array is integrated between the first polarizer and the color filter layer.

10. The interactive control apparatus according to claim 9, wherein the display further comprises a touch layer; and the touch layer is disposed between the color filter layer and the antenna array or between the color filter layer and the liquid crystal layer.

11. The interactive control apparatus according to claim 6, wherein the display is an OLED display comprising a second display panel, and a third polarizer on a display surface of the second display panel.

12. The interactive control apparatus according to claim 11, wherein the antenna array is attached to a side of the third polarizer distal to the display surface of the second display panel.

13. The interactive control apparatus according to claim 11, wherein the second display panel comprises a thin film package layer and an OLED layer stacked together; and
- the antenna array is integrated between the third polarizer and the thin film package layer.

14. The interactive control apparatus according to claim 13, wherein the display further comprises a touch layer; and the touch layer is disposed between the thin film package layer and the antenna array, or between the third polarizer and the thin film package layer such that the antenna array is integrated in the touch layer.

15. The interactive control apparatus according to claim 1, further comprising a printed circuit board,
- wherein the data processing assembly is disposed on the printed circuit board, and the antenna array performs signal transmission with the data processing assembly through a flexible cable.

16. The interactive control apparatus according to claim 1, further comprising a printed circuit board,
- wherein the data processing assembly is disposed on the printed circuit board, and the antenna array is packaged in the data processing assembly.

17. The interactive control apparatus according to claim 1, wherein the display assembly comprises a routing gateway unit;
- the routing gateway unit is configured to receive media data; and
- the display assembly is further configured to display according to the media data.

18. An interactive system, comprising: a terminal device and an interactive control apparatus;
- wherein the interactive control apparatus is the interactive control apparatus according to claim 1; and
- the terminal device is configured to operate according to the control instruction output from the interactive control apparatus.

19. An interactive control apparatus, comprising:
- an antenna array configured to transmit a radar signal and receive a reflected echo signal;
- a data processing assembly configured to determine, according to the radar signal and the echo signal, a body action and a corresponding control instruction, and output the control instruction to a terminal device; and
- a display assembly configured to display the determined body action and/or control instruction;
- wherein the data processing assembly comprises: a low noise amplifier, a mixer, an intermediate frequency amplifier, an analog-to-digital converter, a digital front-end component, a cache, a power amplifier, a power divider, and a waveform generator;
- wherein the low noise amplifier, the mixer, the intermediate frequency amplifier, the analog-to-digital converter, the digital front-end component, and the cache are connected to each other in sequence;
- the waveform generator, the power divider, and the power amplifier are connected to each other in sequence; and
- an input terminal of the mixer is further connected to the power divider, an input terminal of the low noise amplifier is connected to the antenna array, and an output terminal of the power amplifier is connected to the antenna array.

20. An interactive system, comprising: a terminal device and an interactive control apparatus;
- wherein the interactive control apparatus is the interactive control apparatus according to claim 19; and
- the terminal device is configured to operate according to the control instruction output from the interactive control apparatus.

* * * * *